Oct. 17, 1967     W. B. LLOYD     3,348,046
SELF-CONTROLLED SEQUENCE FOR AUTOMATIC STANDARDIZATION
AND CALIBRATION OF NUCLEAR GAUGES
Filed Oct. 1, 1963     5 Sheets-Sheet 1

INVENTOR.
Walter B. Lloyd
BY
Wood, Herron and Evans
ATTORNEYS

INVENTOR.
Walter B. Lloyd
BY
Wood, Herron & Evans
ATTORNEYS

United States Patent Office 3,348,046
Patented Oct. 17, 1967

3,348,046
SELF-CONTROLLED SEQUENCE FOR AUTOMATIC STANDARDIZATION AND CALIBRATION OF NUCLEAR GAUGES
Walter B. Lloyd, Cincinnati, Ohio, assignor to The Ohmart Corporation, Cincinnati, Ohio, a corporation of Ohio
Filed Oct. 1, 1963, Ser. No. 313,113
6 Claims. (Cl. 250—83.3)

This invention relates to apparatus for automatically standardizing a beta gauge.

A beta gauge is a device forming part of an apparatus whose principal function is to provide continuous measurement of the absorption characteristic which may be a function of the density or thickness of a web such as cellophane, paper, laminates, coated products, and the like. It is in this context of the principal use of the apparatus that the invention will be described, although it is to be understood that the invention is not necessarily limited to this specific application.

In the manufacture of webs of material it is most important to provide for a measurement of the thickness or density of the web. At one time it was necessary to cut a portion of the web as it was being manufactured and, using micrometer calipers to measure the thickness of the web. If that measured thickness varied substantially from the desired thickness, manual adjustments were made in the manufacturing apparatus to return the web to the desired thickness. This laborious and expensive manual measurement and control was replaced by automatic measuring devices which would provide a continuous measure of the thickness which required contact with the web as it was being manufactured. In the case of very thin webs, such as cellophane and plastic materials, the direct contact with the web had a tendency to tear the web. A tear which would disrupt the manufacturing process would result in a very expensive down time while the manufacturing process was being returned to its desired state.

The beta gauge provides an answer to the problems attending the use of manual or direct contact gauging devices. Its principal elements are a source which radiate beta rays disposed on one side of a web and a cell disposed on the opposite side of a web, the cell receiving radiation emanating from the source. One cell of the type used in the apparatus of the present invention is described in application of Ohmart, Ser. No. 591,173, now Patent No. 3,152,254 filed June 13, 1956.

Neither the cell nor the source need be in contact with the web whose absorption characteristic is being measured. The cell develops a current which is proportional to the quantity of radiation which it receives. The cell receives only a portion of those beta rays emanating from the source, the quantity of the beta rays received being dependent on the absorption characteristic of the material interposed between the source and the cell. The material interposed between the source and cell is constituted by the atmosphere and by the web whose density and thickness affect its absorption characteristic.

The output voltage of the cell is applied to a control circuit where a meter indicates its magnitude, where it drives a pen on a recorder and where it may be used to operate controls in the manufacturing apparatus to provide a continuous regulation of the material being manufactured.

The standardization of the beta gauge is a most important aspect of the apparatus. In the first place, the beta gauge is a very sensitive instrument, as it has to be in view of its use in the measurement of fractions of a mil of thickness. Any variation in the characteristics of any of the components used in the circuits associated with the beta gauge will cause an error in the output of the system. The presence of dust, oil or any other foreign matter on the cell or even a change in atmospheric conditions will cause an error in the output of the system.

The term standardizing is used to describe the checking of the circuit components and the making of adjustments for any variations which might have occurred in them in order to provide assurance that the output of the system as it measures a web passing between the source and cell will be that for which the system was originally calibrated. The standardization apparatus which will be described hereinafter, could have application to other measuring systems such as the gamma gauge of the type described in co-pending application Ser. No. 298,179, filed July 29, 1963, now abandoned, but it is particularly important for use in a beta gauge because of its high sensitivity as described above.

An objective of the invention has been to provide a fully automatic standardizing apparatus which requires a minimum of time to complete its cycle of operation. To appreciate the desirability of the fully automatic and speedy standardizing cycle of the present invention, it should be understood that in the manufacturing process it is frequently desired to standardize the apparatus every half hour for example, in order to be sure that it is functioning properly. A manual standardization procedure would require ten minutes to one-half hour, and obviously would be unfeasible in a situation requiring standardization every half hour. Other standardization equipment is known, but even the best of the known equipment requires at least one minute to complete the standardization cycle. In this length of time, assuming that manufacturing process continues, it is possible only to manufacture scrap, due to the fact that the period between the prior standardization cycle and the present cycle, the gauge could become seriously out of calibration. Speed of standardizing is therefore to be greatly desired.

It has been another objective of the invention to provide the following steps in the sequence of standardizing operation: move cell and source beyond the edge of the web to be measured; standardize with the cell short-circuited to ground; standardize on air; calibrate the apparatus for the material to be measured, and return the source and cell to its measuring position.

It is another objective of the invention to provide a standardization system in which each of the steps in the sequence described above will proceed immediately following the completion of the preceding step. Several advantages flow from this objective, first it permits proper standardization at each phase in the sequence. Second, standardization is completed in a minimum of time (as low as ten seconds). Third, by avoiding a requirement of standardizing each phase within a prescribed time, a long time may be used if that is required.

Another objective of the invention has been to provide, in the beta gauge circuitry, a span control associated with the meter which indicates the output of the system and to provide for standardization of the span as the last phase in the standardization cycle. The term "span" is used to designate the low and high scale reading in the output meter of the apparatus. Preliminary to the use of the gauge in a particular manufacturing process, the circuitry is set to provide a zero meter reading for the thinnest or lowest absorptive material contemplated, and to provide a full scale reading for the thickest or highest absorptive contemplated to be manufactured. In the beginning the apparatus is calibrated for this material by using the actual material itself in the beta gauge. At that time, reference voltages are determined and set in the apparatus. Thereafter, during the final phase of the standardization cycle, the apparatus is standarized against these reference voltages rather than requiring the physical insertion of standard materials in the beta gauge during the standardization cycle.

It has been another objective of the invention to provide a cluster of three potentiometers each associated with a different phase of the three phases of the standardization sequence, all three potentiometers being driven by a single servo-motor connected to the potentiometers through a gear box and respective clutches.

The use of the single servo-motor is not only a much desired economic improvement in the elimination of three servo-motors, but additionally and perhaps more importantly, it permits the use of a single relay which is energized by the potential across the control winding of the servo-motor as a detector of the null condition which the servo-motor attains.

It has therefore been still another objective of the invention to provide, in the apparatus described above, a relay detector across the control winding of the single servo-motor which drives the three potentiometers whereby the relay initiates the operation of the succeeding sequence of phases at the completion of each phase of standardization. The use of the single servo-motor and the relay associated with it eliminates the need for three detectors associated with three different servo-motors, each detector further possibly requiring an amplifier to be associated with it.

It has been another objective of the invention to provide time delay relays in the standardizing sequence circuit which will provide a sufficient time to achieve a null condition before proceeding to the next phase and to provide a time delay between each phase before the application of the voltage of unbalance to the control winding of the servo-motor in order to permit the circuit to stabilize before any adjustment of the potentiometers occurs.

It has been another objective of the invention to provide electro-mechanical apparatus through which the standardization process can be efficiently and rapidly performed.

These and other objectives of the invention will become more readily apparent from the following detailed description taken in conjunction with the accompanying drawings in which.

Figures 1, 2:
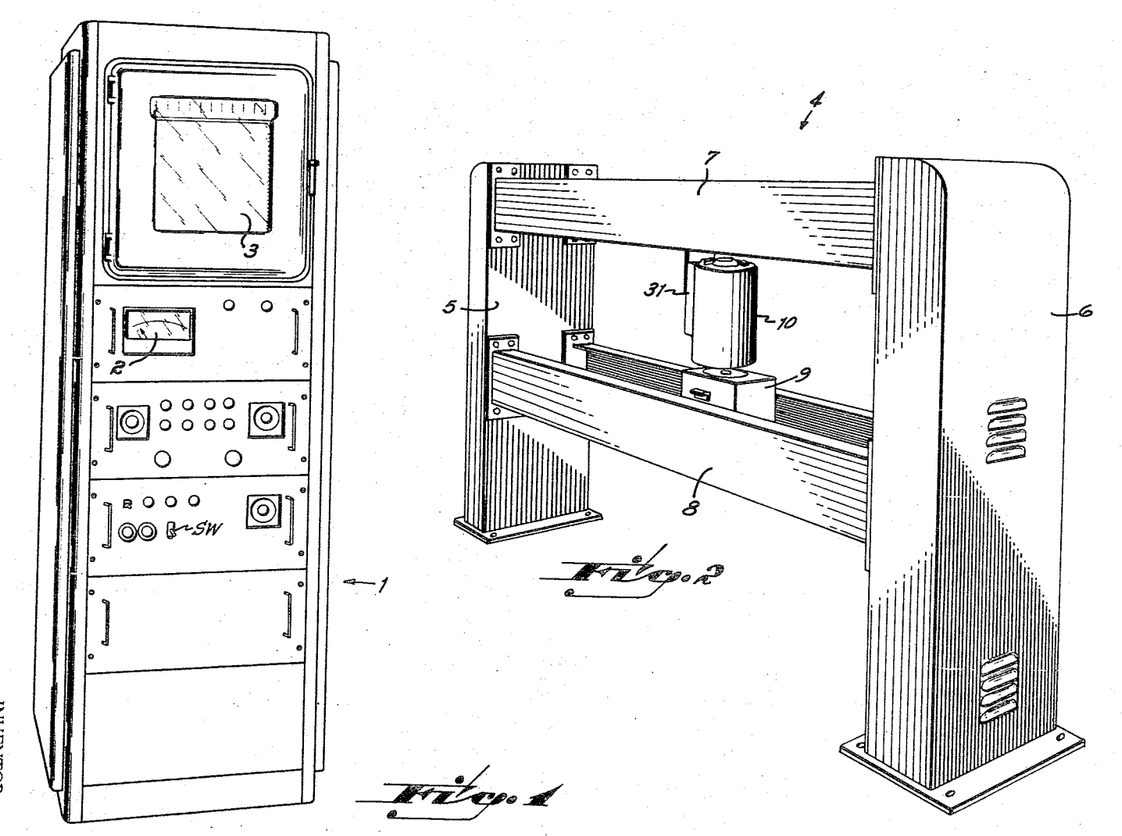
FIG. 1, is a perspective view of a console employed with the present invention.
FIG. 2, is a perspective view of a scanning frame through which the web to be measured passes.

Referring now to the drawings, a console 1 is shown in FIG. 1 in which the electric control circuit is contained and on which are mounted a meter 2, and a recording chart 3, whose functions in the system will become more readily apparent from the detailed description below. Additionally, drawers are provided for the standardization circuit, a programmer and the like. Associated with the console is a scanning frame 4, constituted by a column 5, and a column 6, which contains certain of the electrical and mechanical elements used to operate the apparatus. Upper and lower transverse supports 7 and 8, are mounted between the columns 5 and 6. These transverse supports provide housings for ways and drive screws which control the movement of housing 9 for a radiation source and a housing 10 for the detecting cell.

Figure 3:
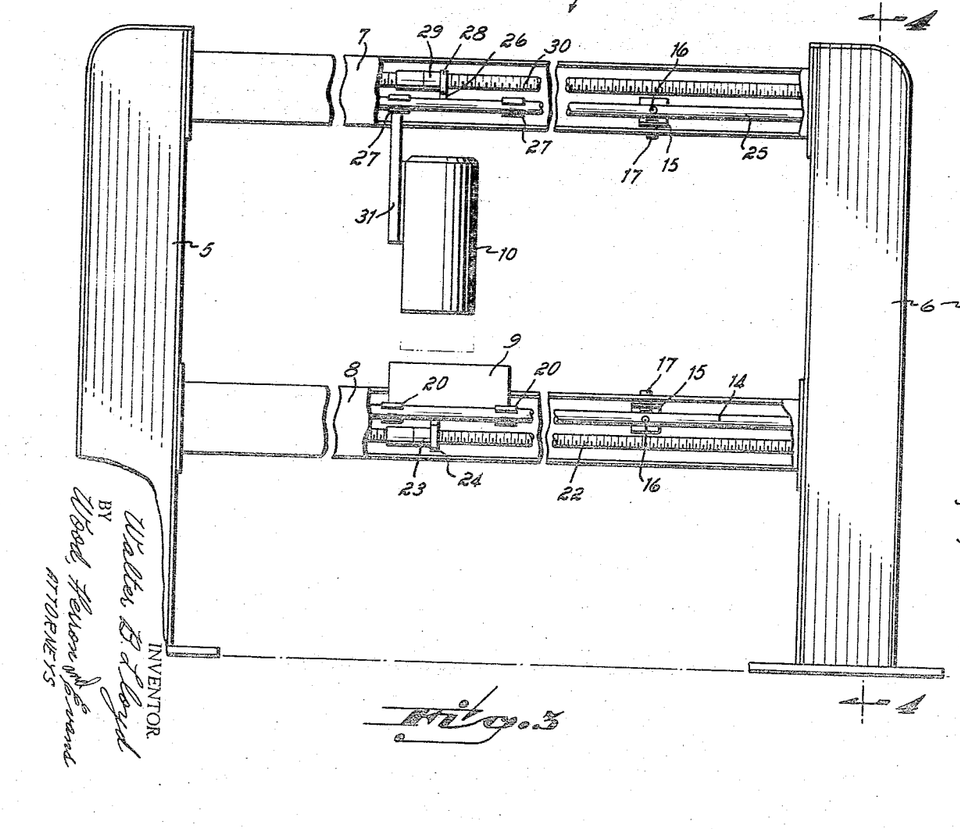
FIG. 3 is a front elevational view, partly in section, of the scanning frame.
Figure 4:
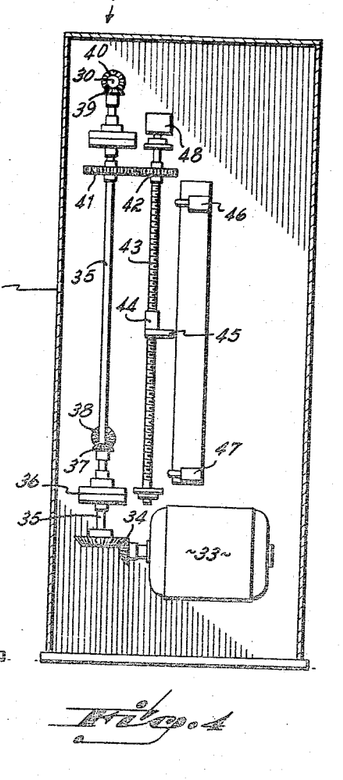
FIG. 4 is a cross-sectional view taken along lines 4—4 of FIG. 3.

The apparatus is shown in more detail in FIGS. 3 and 4. Housed between the lower transverse supports 8 are two parallel horizontal ways 14, each of which is mounted on two longitudinally spaced way brackets 15. The way brackets are fixed to the transverse supports 8 and each has a horizontal screw 16 and a vertical screw 17, the vertical screw 17 providing the means by which the way bracket 15 is secured to the transverse support 8. The way bracket and the way 14 which is mounted to it may be adjusted vertically by rotating the screw 17. The rotation of the screw 17 moves the way up or down depending upon the direction of the rotation of the screw. The screw 16 may be rotated to adjust the way horizontally with respect to the way bracket 15. This adjustment of the ways is necessary for reasons which will become more apparent below. However, it can be seen from FIG. 3 that there are upper and lower ways which support radiation source and the cell respectively and these must be maintained in absolute parallelism, for any variation in the distance between the source and the cell will be reflected in a variation in the output signal of the cell and consequently the accuracy of the system. The source housing 9 has four bearing members 20 by which the source housing 9 is mounted on the ways 14. These bearings are split in order to permit them to pass the way brackets 15 as the source is moved from one side to the other of the scanning frame.

The source housing 9 is driven along the ways by a screw 22 which engages a threaded nut 23 mounted on a cast bracket 24 which is fixed to and extends downwardly from the source holder 9. Rotation of the screw 22 causes the source holder 9 to traverse the scanning frame.

The cell housing 10 is similarly mounted with respect to the upper transverse support 7. Upper ways 25 are secured to the upper transverse supports 7 by means of way brackets 15 having the vertical adjustment screw 17 and horizontal adjustment screw 16 described above. A casting 26 having bearings 27 at its four corners is slidably mounted on the upper ways 25. The casting 26 is constructed similarly to the casting 24 in that they are split to permit them to pass the way brackets 15.

The casting 26 has an upwardly projecting extension 28 to which is fixed a nut 29 which is in threaded engagement with a screw 30 the rotation of which causes the casting to traverse the scanning frame. A downwardly projecting extension 31 of the casting 26 connects the cell housing 10 to the casting so that as the casting moves, it carries the cell housing with it.

The rotation of the screws 22 and 30 is effected by the mechanism illustrated in FIG. 4. There a motor 33 drives a set of bevel gears 34, causing the rotation of a shaft 35 mounted in a bearing housing 36. The shaft has a bevel gear 37 fixed to its lower end portion, the bevel gear 37 meshing with a bevel gear 38, which is fixed to the screw 22. A bevel gear 39 is fixed to the upper end of the shaft 35 and it meshes with a bevel gear 40 which is fixed to the upper screw 30. It can be seen that when the motor 33 rotates the bevel gears 34 and the shaft 35, the screws 22 and 30 will be caused to rotate at identical rotational speeds through the bevel gears which connect the screws to the shaft 35.

The shaft 35 has another gear 41 fixed to it, that gear meshing with a gear 42 which is fixed on a screw 43. A nut 44 and limit switch cam 45 are caused to move vertically upon rotation of the screw 43 into engagement with upper and lower limit switches 46 and 47, which control the extremities of the movement of the apparatus. The vertical traverse of the limit switch cam 45 is either identical to or proportional to the horizontal traverse of the source and cell assembly 9 and 10, and it should therefore, be understood that the limit switches 46 and 47 could be directly operated by the movement of either the radiation source holder 9, or cell housing 10.

The horizontal movement of the source and cell assembly is necessary for the standardization cycle in that the standardization cycle begins with the step of moving the radiation source and cell beyond the extremities of the web which it is measuring. Additionally, however, the movement of the source and cell assembly can be a part of the measuring system in that it permits providing for the constant traverse of the web as it is being manufactured so that all points along its width are rapidly measured for thickness or density. In this respect, it may be advisable to mount a potentiometer 48 in the housing 6, the potentiometer to be driven by the screw 43. The potentiometer would be connected into the measuring circuit and would provide an indication for the measuring circuit as to the specific transverse position of the cell and source assembly.

Potentiometer cluster

Figure 5:
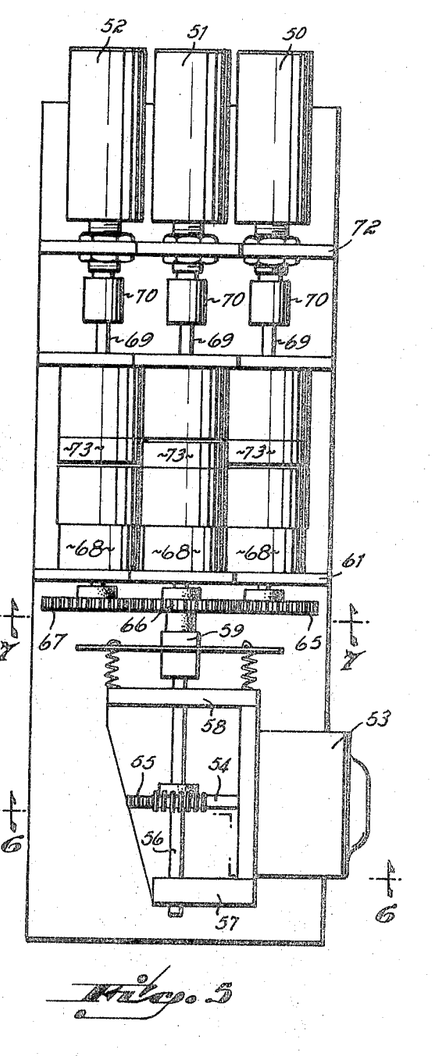
FIG. 5 is a side elevational view of the potentiometer adjusting mechanism.
Figure 6:
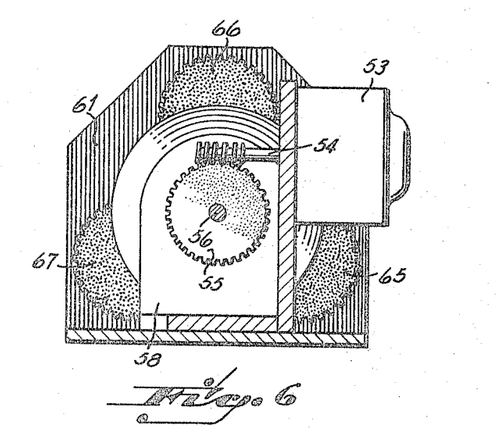
FIG. 6 is a cross-sectional view taken along lines 6—6 of FIG. 5.
Figure 7:
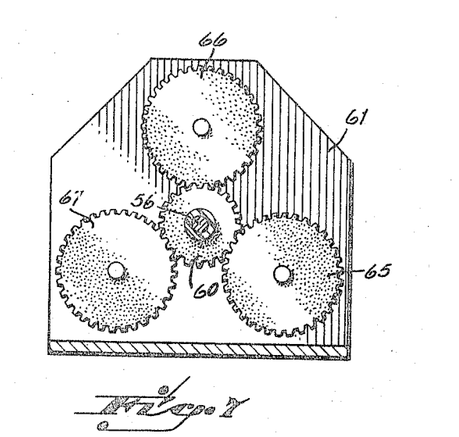
FIG. 7 is a cross-sectional view taken along lines 7—7 of FIG. 5.

The heart of the standardization apparatus is the potentiometer cluster as illustrated in FIGS. 5, 6 and 7. This cluster contains three potentiometers 50, 51, and 52. As indicated above, in the sequence of standardization steps there are three standardizing phases. The first is with the cell shorted, the second is with the cell measuring only air, and the third is standardizing against the material to be measured, or more specifically, the reference voltage which is the function of the density of the material to be measured. In each of these phases, if the apparatus is out of calibration, that is the meter reading for any one of the phases is different from that which it is required to be, an adjustment in the electrical system must be made. That adjustment is effected by one of the three potentiometers 50, 51, and 52, depending upon which phase is being standardized.

The respective potentiometers are driven, for adjustment purposes, by a single servo-motor 53 which rotates a worm 54 connected to a pinion 55. The pinion is fixed to a shaft 56 mounted in bearings 57 and 58. The shaft 56 is connected through a flexible coupling 59 to a central gear 60 which is rotatably mounted on a plate 61. The gear 60 engages cluster gears 65, 66, and 67 which are fixed to the driving members of clutches 68. The driven members of the clutches are connected to shafts 69 which are connected by couplings 70 to the potentiometers 50–52 mounted on a support plate 72. A brake 73 may be associated with the driven member of each clutch in order to fix the angular position of that driven member as well as the potentiometer with which it is associated after any adjustment has been made.

The motor 53 is a split phase alternating current motor. One phase of which is selectively connected, during standardization, to the output of a potentiometric recorder, as will be described below. During each phase of standardization, the motor rotates until the potentials on the control winding returns to zero corresponding to a null reading or zero output in the potentiometric recorder indicating that standardization has been attained.

Standardization circuit

Figure 8:
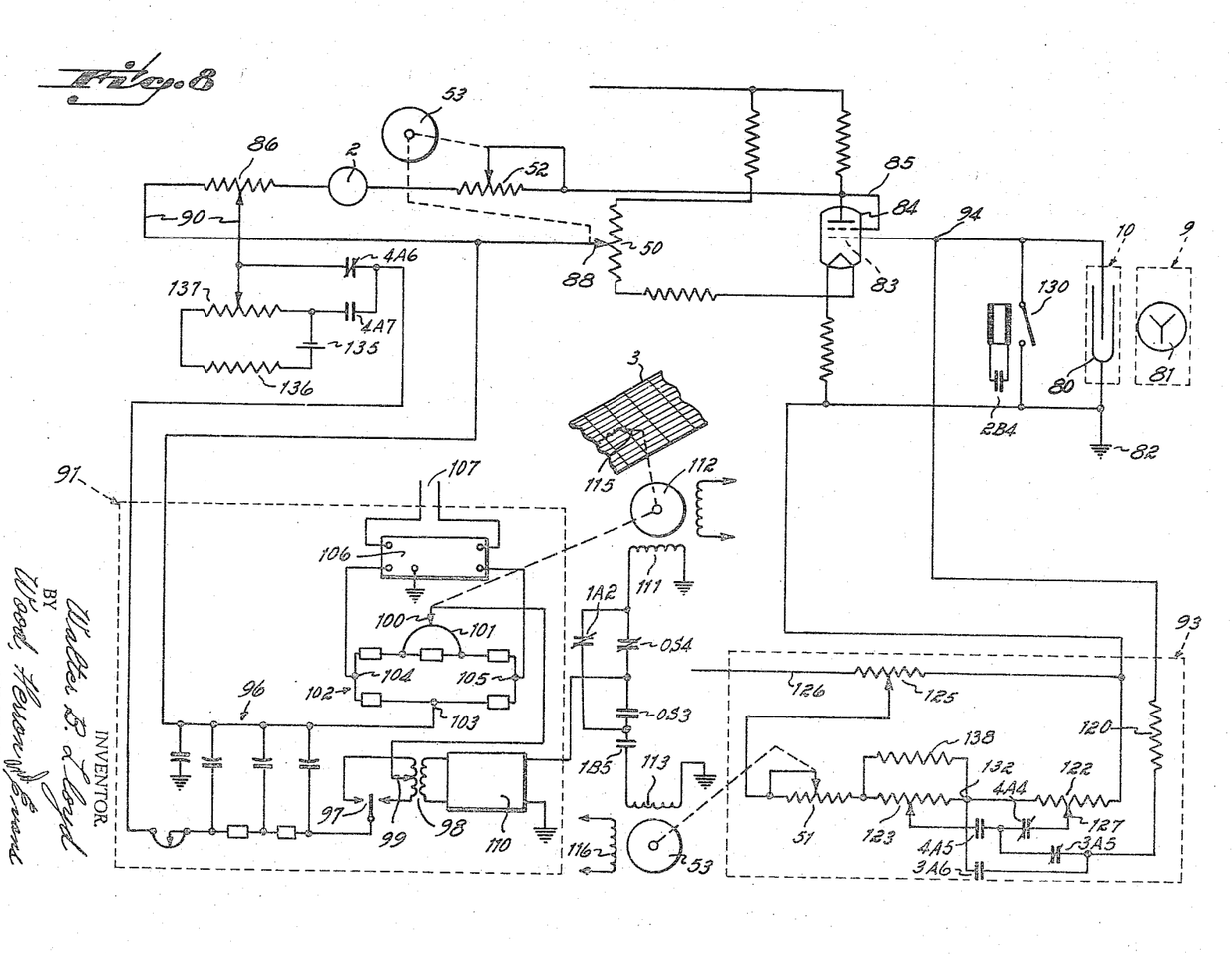
FIG. 8 is a schematic circuit diagram of the standardization circuit.

A schematic standardization circuit of the present invention is illustrated in FIG. 8. The circuit is connected to the output of the cell indicated at 80 which receives beta radiation from the source indicated at 81. The current generated from this cell is negative with respect to ground 82 and is connected through a summing point 94 to the grid 83 of an electrometer tube 84 which has a gain of about 200 and amplifies the signal from the summing point 94 which will be a function of the signal from cell 80. The plate 85 of the electrometer tube is fed through the potentiometer 52, the meter 2 and potentiometer 86, to a variable tap 88 on the zero check potentiometer 50. The potentiometer 86 has an output 90 which is fed into a potentiometric recorder 91, a standard device which is diagrammatically illustrated. The output 90 of the potentiometer 86 is directly proportional to the current from the output of the electrometer tube which in turn is a function of the radiations received by the cell 80, as will be explained below.

A reference voltage circuit 93 supplies a positive and fixed direct current to the summing point 94. The output of the electrometer tube will, therefore be proportional to the difference between the cell current and the reference current at summing point 94. The use of the reference current effectively converts the apparatus to a direct reading apparatus. As the density of the material being measured increases, the radiation and consequently the negative cell current decreases; consequently the positive voltage of the summing point 94 increases with the increase of absorption characteristic of the material being measured. The output 90 across the potentiometer 86 is a direct current which when fed into the potentiometric recorder circuit 91 is first filtered in the circuit indicated generally at 96. That filtered voltage is fed through a chopper 97 to develop a pulsating direct current voltage which is converted to an alternating current voltage through transformer 98. A center tap 99 on the primary winding of transformer 98 is connected to a tap 100 on a slide wire 101 forming an input connection to a bridge circuit 102. The opposite connection 103 is formed by one side of the output 90 of the potentiometer 86. The other two connections 104 and 105 to the bridge circuit are provided by the output of a regulated direct current voltage power supply 106, fed by an alternating current input 107.

When the bridge is out of balance, a voltage appears across tap 100 and connection 103. This voltage is chopped, converted to alternating current by transformer 98 and is amplified by amplifier 110. The output of amplifier 110 is fed to a control winding 111 on a pen driving motor 112 or to a control winding 113 on the standardizing motor 53. The output shaft of the pen motor is connected to the tap 100 on the slide wire 101 and to pen 115 which engages the chart 3.

In the normal operation of the apparatus insofar as it applies to the circuit of FIG. 8, contacts OS4 and 1A2 which connect the recorder 91 to the pen motor 112 are closed. The contacts OS3 and 1B5 which connect the recorder 91 to the recorder motor 53 are open. The output of the cell 80 which varies inversely with the density of the material being measured is of negative polarity and is fed to the summing point 94. That summing point has a positive current of greater absolute magnitude than the output of the cell, which positive current is fed to it from the reference voltage network 93. The difference between those currents is amplified and is fed through the meter 2, mounted on the console 1 (as shown in FIG. 1), to the potentiometer 86. The output 90 across the potentiometer 86 is fed into the bridge circuit 102 by way of the slide wire tap 100 and connection 103. If that voltage should increase because of an increase in the density of the material passing between the cell and source, the bridge 102 will become unbalanced and a potential difference will appear across the points 100 and 101. That potential difference will be amplified and fed to the control winding 111 of the pen motor 112. The pen motor will then rotate in the direction indicated by the increased voltage across potentiometer 86 causing the slide wire tap 100 to move. The tap will move until a balance has been obtained on the bridge. Simultaneously, the pen 115 will be moved transversely with respect to the chart 3 until the balance in the bridge is achieved. When the balance is achieved, there is no more voltage appearing across the tap 100 and connection 103 and motor 112 ceases to rotate.

The foregoing has been a description of the normal operation of the apparatus. During this operation, the absorption characteristic of the material can be read directly on the meter 82 or can be observed by the markings which the pen 115 has made on the chart 3. The validity of the meter readings and chart indications are, however, dependent upon the accuracy of the apparatus. This accuracy is dependent in part on the electrometer tube 84 maintaining its original characteristics and upon the contaminated conditions of the air around the cell 80 and source 81. If the plant in which the apparatus is used is dusty, within a short period of operation, dust will collect on the windows of either or both of the cell and source housings. The dust will absorb radiations and cause the meter to read higher than the quality of the material passing through the gauge actually dictates.

It is therefore, necessary, from time to time, to standardize the apparatus.

The standardization operation employs the reference circuit 93 whose function is to apply a current of preselected magnitude through the high-meg resistor 120 so as to provide the positive current at the summing point 94. The magnitude of that current at the summing point 94 is directly dependent upon the settings of the potentiometers forming the reference voltage circuit 93.

The reference voltage circuit comprises three potentiometers 122, 123, and 51 which are connected in series with each other, the series connection of potentiometers being connected across a major adjustment potentiometer 125. The potentiometer 125 is connected at 126 to a positive direct current voltage supply.

Potentiometer 122 is a lock suppression potentiometer which is connected through two relay contacts to the high-meg resistor 120. That potentiometer is pre-set and is not changed during the normal operation of the apparatus including the periodic standardization. The position of its tap 127 with respect to its resistor element determines the magnitude of the current which will be applied to the summing point 94 during normal operation. That current must be high enough to drive the meter to full scale position when a material of the highest absorptive characteristic to be measured is inserted between the source and cell.

The next potentiometer 123, in the series is a lock calibrate potentiometer whose function and setting will be discussed below. At this point it should suffice to say that it provides a reference voltage to determine whether the full scale reading of the meter is accurate during the standardization sequence.

The third potentiometer, 51, of the series is a standardizing potentiometer which is operated during the standardization sequence. It functions to standardize the apparatus on air, that is to change the voltage applied at the summing point to compensate for any change in condition of the air or foreign matter on the cell or source window and the like.

The function of the potentiometers and the manner in which they are set to perform their prescribed functions can best be explained by describing generally the standardization sequence.

Zero check

Prior to the beginning of the first phase of the sequence the gauge constituted by the cell and source is moved off the sheet to one side of the machine as has been described above. Simultaneously, relay contacts will shift the output of the potentiometric recorder from the pen motor winding 111 to the control winding 113 of the recorder motor 53.

The first phase of the sequence is the "zero check" or electrical balancing of the system, particularly the electrometer tube. The first step in this phase is the closing of relay contacts 130, which short circuits the summing point 94 and the grid 83 to ground. The voltage at the plate 85 should be at the same potential as the tap 88 of potentiometer 50 of the electrometer tube 84. However, if the electrical system is out of balance, a current will flow through meter 2 and potentiometer 86. That voltage across the potentiometer 86, applied to the potentiometric recorder 91 will cause the operation of the recorder servo-motor 53 which will in turn drive the potentiometer 88 until a null condition is attained that is, until the potential at tap 88 is equal to the potential at plate 85.

Standardizing on air

The next phase of the sequence involves standardizing on air. At the beginning of this sequence the high-meg resistor 120 is disconnected from the tap 127 to potentiometer 122 and is connected to a point 132 which is at the low potential side of potentiometer 123. Simultaneously, the short circuit of the electrometer tube is relieved by the opening of the contacts 130.

It should be understood at this stage that the gauge has been moved to the side of the sheet being measured so that only air is interposed between the cell and source. Since only air can absorb the radiation during this phase, the negative current developed by the cell 80 will be higher than usual. The positive current brought into the summing point 94 through high-meg resistor therefore must be higher than is applied during normal operation in order to compensate, or null, or balance out, the negative current from the cell 80. It is for this reason that during standardization on air that the high-meg resistor is connected to a point of higher potential, namely point 132, than the point 127 which is employed during normal operation.

If during the normal operation immediately preceding the standardizing sequence, the dust condition of the air has changed or a deposit has been formed on either the cell 80 will, therefore, be of lesser magnitude than it tion will be absorbed than had been absorbed during the previous standardization cycle. The negative current from the cell 80, will therefore, be of lesser magnitude than it was during previous standardization. The positive current at the summing point 94 will have a greater value than the negative current from the cell and there will be an up-scale reading on the meter 2 and a voltage appearing at the output 90 of the potentiometer 86. This output applied to the potentiometric recorder 91, will drive the recorder-servo 53, which operates the potentiometer 51. The potentiometer will be operated in a direction which will tend to decrease the current applied from the high-meg resistor to the summing point 94 to bring it into balance with the negative current from the cell 80. In the FIG. 8, the tap of the potentiometer 51 will be moved toward the left in order to introduce more resistance into the series circuit to the high-meg resistor 120, thereby decreasing the current through it.

When the positive current applied to the summing point 94 equals the negative current from the cell 80, there will be no current flowing through the meter and the potentiometer 86. A null having been attained, the recorder motor 53 will cease operation and the next phase of the sequence will begin.

Calibration phase

The third phase of the standardizing sequence is the calibration adjustment. Because changes have been made in the electrical system through the adjustment of the potentiometer 50 during zero-check and the potentiometer 51 during standardizing on air, the apparatus must be recalibrated so as to provide assurance that the meter will read zero when a pre-selected material of low ton characteristic is introduced and will read full scale when a pre-selected material of high absorption characteristic is introduced. For the sake of convenience of explanation, let it be assumed that the particular material to be measured will be within a span of 30 grams per square meter and 40 grams per square meter.

Further, to understand the calibrating phase, it is necessary to understand the settings which have been made in the apparatus prior to operation. If the apparatus is to be used to maintain a continuous check on the thickness of cellophane, for example, which will be in the range of 30–40 grams, the apparatus must be calibrated to do that specific job. Calibration is simply the operation of setting certain potentiometers in the electrical circuit to provide a zero reading on the meter when the 30 gram material is introduced between the source and cell and to provide a full scale reading of the meter when a 40 gram material is introduced between the source and cell.

The zero setting is made through the operation of the lock suppression potentiometer 122. During initial calibration, a 30 gram sample is introduced between the cell and source and the lock potentiometer is adjusted until zero reading on the meter is obtained. It might be noted at this point, that the potentiometer may be provided with a dial having indicia from one to one-thousand so that after the initial calibration is made, the dial setting for "30 gram cellophane" can be noted and thereafter any time a run of cellophane of this range is to be made the dial can be set without requiring the introduction of the 30 gram sample.

With the potentiometer 122 and its tap 127 still connected to the high-meg resistor 120, a 40 gram sample is introduced between the cell and source. This sample will reduce the radiation to the cell and consequently will reduce the negative current appearing at the summing point. The higher positive current will drive the meter toward full-scale. The meter is brought exactly to full scale by the manual adjustment of the normally automatic potentiometer 52, which is in series with the meter. The potentiometer 52 could be employed in parallel with the meter, is desired.

When the potentiometer 52 has been set to provide a full-scale reading, the 40 gram sample is removed from the cell and source. The meter will then give a down-scale reading because of the greater radiation permitted to reach the cell 80 because of the removal of the sample. The high-meg resistor 120 is then connected to the lock calibration resistor 123 through the operation of certain relay contacts as will be described below. The connection of the high-meg resistor to the lock calibration potentiometer applys a greater positive current to the summing point 94 and again urges the meter toward a full-scale reading. The lock calibration potentiometer is then adjusted until the meter reading is precisely full-scale. This potentiometer R3 also has a dial which through the above operation is fixed for 40 gram cellophane.

It can be seen, therefore, that the function of the lock calibration resistor 123 is to apply a reference current to the summing point 94 when the cell is reading on air which will provide a scale reading equivalent to that which is produced when the cell is reading on a 40 gram sample during normal operation, that is when the high-meg resistor is connected to the lock suppression potentiometer 122.

In this manner, the dial settings on the lock suppression potentiometer 122, and on the lock calibration potentiometer 123 are obtained. These are fixed for any particular run of material, and need not be changed. They provide the proper span of reference currents for full-scale and zero-scale reading during automatic standardization.

As indicated above, during standardization the servomotor 53 operates until a zero voltage occurs across its control winding. Obviously, at full-scale reading there will be a measurable current passing through the meter and the potentiometer 86 which would drive the recorder motor 53 and the potentiometer 52; whereas, to the contrary it is necessary to stop the operation of the motor 53 when full-scale condition is obtained.

To accomplish this, a bucking circuit has been introduced to apply a voltage at the output 90 of the potentiometer 86 which is equal and opposite to the voltage at the output at full-scale operation of the meter. The bucking circuit is constituted by a mercury cell 135, a resistor 136, and a calibration balance potentiometer 137. That circuit provides a constant voltage in series between the tap of the potentiometer 86 and the input to the potentiometric recorder 91 which will oppose the voltage caused by full-scale current passing through the potentiometer 86.

That bucking circuit is normally disconnected from the apparatus, but is connected into the apparatus only during the third phase of standardization.

During the initial calibration of the apparatus when the reference voltage from lock calibration potentiometer 123 is applied in order to give a full scale reading on the meter 2, the bucking circuit is calibrated. The potentiometer is adjusted until a zero voltage input appears at the recorder 91. This can be determined by the introduction of a signal light into the circuit, as will be described below. After the bucking circuit has been adjusted so that its potential exactly opposes that developed across the potentiometer 86 at full scale reading, the cal-balance potentiometer 137 is left at that fixed position.

The curve of cell current versus weight of material in the airgap is non-linear. Under clean conditions operation will take place on one section of the curve having a certain slope. Under conditions of dirt between the cell and source, operation takes place over another section of the curve having a more gradual slope, that is, one which results in a smaller change in cell current for the same change in weight of material in the airgap.

Similarly, after deterioration, the cell has a more gradual slope which produces a similar change in cell current.

Using the example referred to above, during standardization on air, the apparatus changes the current from the reference circuit 93 to that value which will cause a substantially zero reading on the meter 2 when a 30 gram sample is introduced.

Because of the change in the slope of the cell curve, however, a 40 gram sample in the airgap will drive the meter to a position below full scale. It is therefore necessary to decrease the resistance in series with the meter, through the operation of potentiometer 52 to bring the meter to full scale.

This adjustment is determined by the value of the current produced from the tap on potentiometer 123, that value having been decreased from its previous value through the operation of standardized potentiometer 51.

In the absence of shunt resistor 138 the changes of current from potentiometer 123 would be proportional to the change of current at standardize point 132 upon adjustment of potentiometer 51. However, because of the non-linearity of the curve, a proportional change would be too great a change, and the compensation by potentiometer 52, during the calibration phase, will be too great.

The shunt resistance 138 is connected across potentiometer 123 to reduce the magnitude of change in the current from potentiometer 123 when potentiometer 51 is adjusted. The shunt resistor is preferably physically located so that it can be interchanged with resistors of differing values, to readily adapt the apparatus to materials of widely varying absorption characteristics.

*Standardizing sequence circuit*

Figure 9:
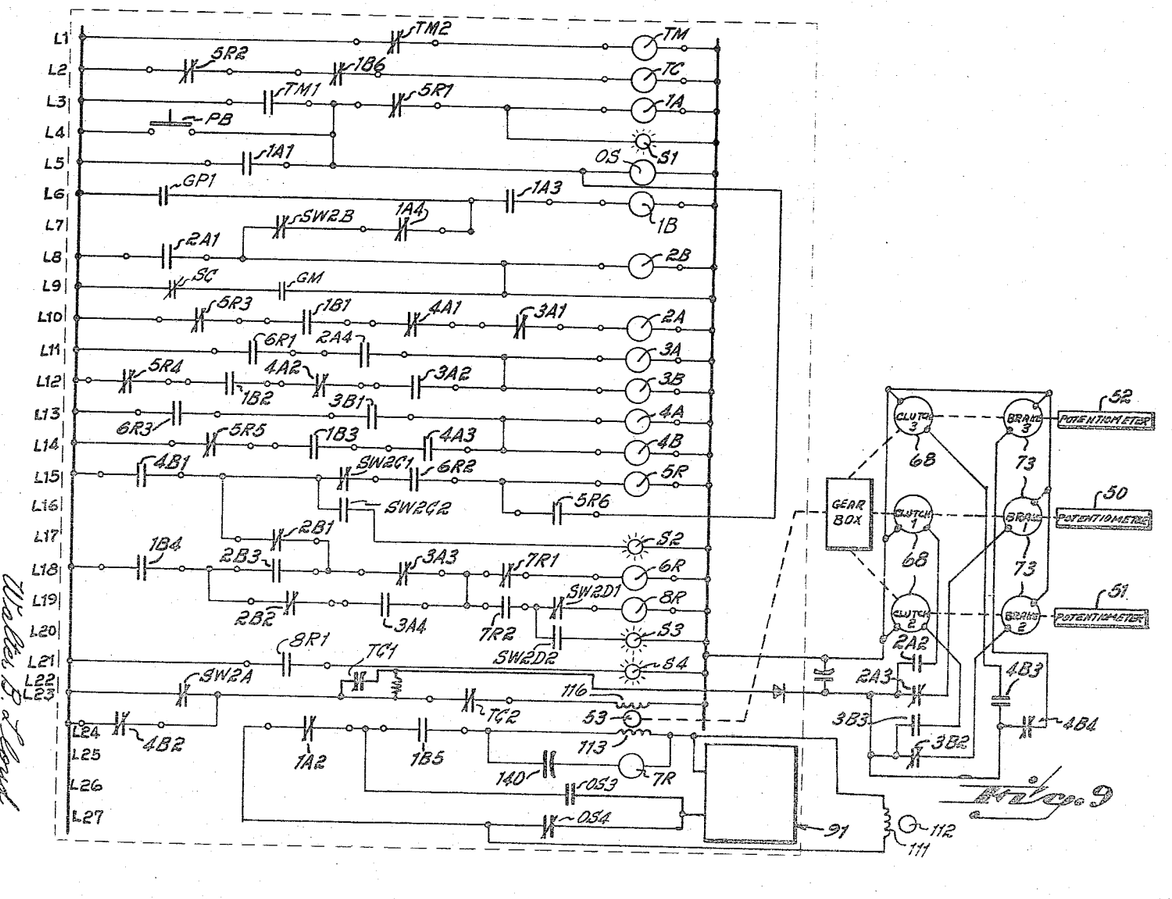
FIG. 9 is a circuit diagram of the relay circuit which controls the standardization sequence.

The standardizing sequence circuit is to provide for the automatic sequencing of the three phases of standardizing, namely the zero check, the standardizing on air, and the calibration adjustment. One of the important features of this invention is that it will cause the operation of the three phases in sequence with each succeeding phase following immediately after the completion of the preceding phase with no time delay other than that required to provide assurance that the preceding phase has been completed. Ultimately, the function of this standardizing sequence circuit is to drive the three potentiometers 50, 51, and 52 when it is necessary to drive them in order to compensate for changes in the apparatus or environmental conditions which occurred in the interval between the standardization immediately preceding.

There are seven principal relays or pairs of relays and associated contacts which effect the desired sequencing of phases. Relays 1A and 1B initiate the operation of the circuit. Relays 2A and 2B effect the zero check phase or electrical balancing when the cell and electrometer tube are shorted to ground. Relays 3A and 3B effect the standardizing on air phase. Relays 4A and 4B effect the calibration phase of adjustment. Relay 5R effects the end of the standardization cycle and returns the apparatus to normal operating conditions. Relay 6R is a null time delay relay which switches from one phase to the next. Relay 7R is a null relay which discerns the fact that the recorder servo-motor 53 has completed its movement and relay 7R actuates relay 6R.

The standardizing circuit can be set for periodic automatic operation as for example, every hour or half hour. In a dusty plant or operation, a more frequent standardizing is required than would be the case in a clean operation. Alternatively, standardizing can be initiated by the operation of a push-button, PB.

Automatic operation is initiated by either a timing motor TM, which closes contacts TM1, or by a push-button, PB. In either event, the relay 1A is energized, (L3).

For convenience of following the description, the lines on the ladder diagram of the circuit of FIG. 9 have been numbered and reference will be made to those numbers in parantheses in order to identify quickly the location of the relays or contacts.

The relay 1A is locked in by its contacts 1A1 (5). Simultaneously, contacts TM2 (L1) are open by the timer motor relay TM. Relay 1A will remain energized until relay 5R (L15) is operated to open contacts 5R1 (13) as will be explained below.

The energization of relay 1A (L3) simultaneously operates a signal lamp S1 (L4) to indicate that standardization is proceeding.

The closing of holding contacts 1A1 causes the operation of an off-sheet relay OS (L15) which, through programmed circuitry, not shown, causes the motor 33 to drive the screws 22 and 30 carrying the gauge, that is, source and cell housing off the edge of sheet passing through the frame. Energization of relay OS also operates contacts OS3 and OS4 shown also in FIG. 8 to shift the output of the recorder 91 from the winding 111 of pen driving motor 112 to the winding 113 of the recorder motor 53.

When the motor 33 has caused the cell and source to move off the sheet, the programmer causes contacts GP1 (L6) to close thereby providing a path energization of relay 1B. These contacts are programmed to close only when the gauge is off sheet and has stopped moving and relay OS is energized.

Relay 1A opens contacts 1A2 (L24) which, in combination with the operation of OS3 and OS4 shifts the output of potentiometric recorder 91 to the winding 113 of servo-motor 53. The relay 1A also closes the contacts 1A3 (L6) and opens contacts 1A4 (L7).

The closing of contacts 1A3, followed by the closing of contacts GP1 completes a circuit to relay 1B. Relay 1B closes contacts 1B1 (L10), closes contacts 1B2 (L12), closes contacts 1B3 (L14), closes contacts 1B4 (L18), closes contacts 1B5 (L24) and opens contacts 1B6 (L2). The opening of contacts 1B6 deenergizes a clutch TC on the timer and shifts the condition of the timer clutch contacts TC1 (L22) and TC2 (L23) to closed condition. The latter contacts could be operated equally well by relay 1B, but economy and convenience dictates the use of the timer clutch contacts. All of these 1B and TC contacts remain in the condition described until the end of the standardization cycle.

Contacts TC1 provide a path to the clutches 68 and brakes 73 associated with potentiometers 50–52. Contacts TC2 provide a path to the reference winding 116 of servomotor 53 thereby permitting it to operate.

The relay 1B provides an operating path for relay 2A through the closing of contacts 1B1 (L10). Relay 1B also provides operating paths for relays 3B through contacts 1B2 (L12); relay 4B through contacts 1B3 (L14); relay 6R through contacts 1B4 (L18) and to control winding 113 through contacts 1B5 (L24).

The closing of contacts 1B1 (L10) energizes relay 2A. The energization of relay 2A closes contacts 2A1 (L8) which closes the circuit to relay 2B. The relay 2A also closes contacts 2A2 to energize the clutch to potentiometer 50 and opens contacts 2A3 to de-energize the brake of potentiometer 50.

The relay 2B opens contacts 2B1 (17) and 2B2 (L19), and closes contacts 2B3 (L18). The closing of contacts 2B3 forms an operate path to relay 6R which, as indicated above, is the switching relay through which operation is switched from one phase in the sequence to the next succeeding phase. Relay 6R has a two second time delay before operating. Upon the closing of contacts 2B3, the relay 6B has at least an instantaneous operate path, and relay 6R will operate if no correction is required at zero check. However, as will be explained below, if a correction is required, the contacts 7R1 (L18) will open to break the operate path to relay 6R before that relay can operate.

Relay 2B operates the contacts 2B4 which effect the energization of the relay associated with contacts 130 (FIG. 8) which connects the cell 10 and grid 83 of electrometer tube 84 to ground.

At this point let it be assumed that there is a state of unbalance in the electrical circuit causing a voltage at the output of recorder circuit 91 which applies a voltage to the winding 113 of the servo-motor 53. The motor 53 operates through the clutch 68 to drive potentiometer 50 until a null reading is obtained. The voltage across the winding 113 energizes the relay 7R (L25). The condenser 140, in series with the relay 7R, is for the purpose of blocking out any stray DC components which might effect the operation of the relay.

Energization of relay 7R will open contacts 7R1 and will close contacts 7R2. Closing contacts 7R2 provides an operate path to relay 8R (L18), which has a 45 second time delay. If during any of the three phases a null condition cannot be attained, within 45 seconds, signal light S4 will be energized through the closing of contact 8R1 (L21).

When a null reading is obtained during the zero check, the potential across the winding 113 returns to zero and the relay 7R is deenergized.

The energization of relay 7R opens the contacts 7R1 in the path to relay 6R (L18).

After the completion of the zero-check and the obtaining of a null reading, the potential across control winding 113 drops to zero and relay 7R returns to its normal deenergized condition. Deenergization of relay 7R opens contacts 7R2 preventing the operation of relay 8R. It closes the contact 7R1, thereby completing the path to relay 6R, which operates after a two second delay. In addition to preventing the instantaneous operation of relay 6R upon the closing of contacts 2B3, the purpose of the time delay of relay 6R is to provide assurance that the null condition during the check of any one of the three phases is not a transient condition, but rather is the desired steady state condition.

Energization of relay 6R closes contacts 6R1 (L11) providing an operate path to relay 3A and closes contacts 6R2 (L115) providing an operate path to relay 5R, but the path to relay 5R is held open by the contacts 4B1 (L15).

The energization of relay 3A causes the opening of contacts 3A1 in the path to relay 2A (L10); the operation of contacts 3A2 (L12) providing an operate path to relay 3B and a lock path to relay 3A; operates contacts 3A3 (L18) which opens one path to relay 6R, but operates contact 3A4 which provides an alternate path to relay 6R (L19) through contacts 2B2 which will be returned to their closed condition as will be seen below.

The opening of contacts 3A1 opens the path to relay 2A (L10) and causes the return of the contacts of relay 2A to their normal condition. The opening of contact 2A1 will open the circuit to relay 2B causing the release of the contacts associated with relay 2B. The return of the contacts of relay 2A to their normal condition effects contacts 2A2 and 2A3 associated with the clutch 68 and brake 73, respectively, of potentiometer 50 so that the clutch is deenergized and the brake is energized to fix the potentiometer in the desired position.

The closing of contacts 3A2 (L12) energizes relay 3B, which has a two second time delay before operating its contacts. This delay provides a stabilizing period before connecting servo-motor 53 to potentiometer 51. Relay 3B closes contacts 3B1 to relay 4A (L13) relay 4A being held in deenergized condition by the open contacts 6R3. Relay 3B also opens contacts 3B2 to the brake 73 associated with potentiometer 51 and closes contacts 3B3 associated with clutch 68, associated with potentiometer 51. This sequence of operations has placed potentiometer 51 in a condition to be driven by recorder motor 53 if a potential occurs on control winding 113. Simultaneously, the opening of contacts 2B4 (FIG. 8) has disconnected the ground connection of the electrometer tube 84 and the cell 80 so that the cell is now measuring the radiations passing through the air between the cell and the source. Also referring to FIG. 8, the energization of relay 3A opens contacts 3A5 and closes contacts 3A6 to connect the high-meg resistor 120 and the summing point 94 to the air standardization point 132. If no change has occurred since previous standardization, there will be no drop across the output 90 of potentiometer 86 and the potentiometric recorder 91 will apply no potential to the winding 113 of recorder motor 53. The system will then proceed to the next phase, as will be described below. However, if an unbalance in the voltages at the summing point occurs and an output voltage across potentiometer 86 is noted, a voltage will be applied to the winding 113 to drive potentiometer 51 until null condition is obtained.

When null condition is attained, the potential across winding 113 has dropped to zero and relay 7R is deenergized. The deenergization of relay 7R closes contacts 7R1 and a path to relay 6R is found through contacts 1B4, 2B2, 3A4, and 7R1.

Relay 6R again closes contacts 6R1 (L11) and 6R2, and 6R3 (L13). Contacts 6R1 are ineffective because of the open contacts 2A4, and contacts 6R2 are ineffective because of open contacts 4B1. However, contacts 6R3 provide a path to relay 4A (L13) which operates relay 4A. The operation of relay 4A opens contacts 4A1 (L10) to assure that relay 2A will remain deenergized. It opens contacts 4A2 in the lock circuit of relay 3A to deenergize relay 3A. Relay 3B is similarly deenergized. Relay 4A operates contacts 4A3 to provide an operate path to relay 4B and to lock path to relay 4A. Referring to FIG. 8, relay 4A opens contacts 4A4 and closes contacts 4A5 to provide a part of the operate path to lock calibration potentiometer 123 employed in the third or calibration phase of standardization. Contacts 4A6 are opened and contacts 4A7 are closed to introduce the bucking circuit including the potentiometer 137.

In deenergizing relay 3A contacts 3A5 and 3A6 (FIG. 8) are returned to their normal condition thus completing the path from the summing point 94 through the high-meg resistor to the tap on lock calibration potentiometer 123. Relay 3A3 of FIG. 9 (L18) is returned to closed condition to provide a portion of the operate path to relay 6R.

After a two second time delay following energization of relay 4B contacts 4B1 (L15) are operated completing the path to the relay 6R. In that two second period a potential will appear on control winding 113 thereby energizing relay 7R which opens contacts 7R1 (L18) to deenergize 6R. Contacts 4B2 (L24) are opened to permit manual calibration as will be described below. Contacts 4B3 and 4B4 to the clutch 68 and brake 73 associated with potentiometer 52 are operated to engage the clutch and dis-engage the brake thereby connecting the potentiometer 52 to the servo-motor 53. Simultaneously, through the deenergization of relay 3B the contacts 3B2 and 3B3 are returned to their normal condition thereby applying the brake 73 and disengaging the clutch 68 to the potentiometer 50 thereby locking that potentiometer in its fixed position.

If a state of unbalance exists, the potentiometer 52 will be operated driving the meter 2 to its full-load reading which applies a voltage at the output 90 of potentiometer 86 which is equal and opposite to the voltage developed by the bucking circuit at potentiometer 137. The relay 7R, energized by the state of unbalance which applied a voltage to reference winding 113, is deenergized when the null condition is obtained, thereby causing contacts 7R1 to complete the circuit to relay 6R. The operation of relay 6R closes contacts 6R2 to relay 5R. Relay 5R opens contacts 5R1 (L3), contacts 5R2 (L2), contacts 5R3 (L10), contacts 5R4 (L12), 5R5 (L14), and closed contacts 5R6 (L16).

Opening of contacts 5R1 drops out relay 1A when the relay 1A drops out contacts 1A3 (L6) open and relay 1B drops out. Contacts 5R3 open the path to relay 2A, contacts 5R4 open the path to relay 3B and the lock circuit to 3A. Contacts 5R5 open the path to relay 4B and the lock circuit to relay 4A. The deenergization of relay 4B causes the contacts 4B3 and 4B4 associated with the clutch 68 and brake 73 of potentiometer 52 to return to their normal condition locking the potentiometer in its set position. The closing of contact 5R6 locks 5R in to insure releasing of 1A relay through contact 1A1 releases relay OS and the 5R6 lock.

The deenergization of relay 1A opens contacts 1A1 (L5) to the off-sheet relay OS which permits the programmer to take over and return the source and cell to the sheet which is to be measured. The deenergization of the OS relay also causes contacts OS3 and OS4 to return to their normal condition along with the return of contacts 1A2 and 1B5 to their normal condition, shifts the output of the potentiometric recorder 91 from the recorder motor winding 113 to the pen motor winding 111.

Operate-calibrate switch

The console is provided with a switch SW which in one position is at "operate" and remains there during a normal operation of the apparatus. The other position of the switch is at "calibrate" and is switched to that position for manual calibration for the reasons set forth below. There are a plurality of contacts associated with that switch, these contacts being shown in the diagram of FIG. 9. These contacts are designated by SW. As shown in FIG. 9, these contacts are in the condition which they assume when the switch is at "operate" position.

The switch is at operate position during normal operation, normal standardization sequence and standby condition. "Standby" is the condition of the apparatus when it is not being used to measure the absorption characteristics of a web and the cell and source are in an off sheet position.

When the apparatus is on standby, it is desirable to maintain the standardizing circuit in a zero check condition, that is with the grid 83 of the electrometer tube 84 shorted to ground. This provides assurance that the meter pointer wil rest at zero position on the scale. If the apparatus were not maintained in the zero check condition, the cell and source would be measuring air. This would cause the meter pointer to be pegged down scale, and if held in such a down scale position over a prolonged period of time would cause injury to the mechanism of recorder 91.

The maintenance of the apparatus in the zero check condition is attained through the energization of relay 2B (L8), this being accomplished through the path including contacts SW2B (L7), contacts 1A4 (L7) and contacts GP1 (L6). The contacts GP1 are maintained in closed condition by the programmer when the apparatus is in standby condition.

From time to time it is necessary to calibrate the apparatus manually and obviously this cannot be done when the electrometer tube is shorted to ground. There must be provision for releasing the zero check condition. This is one of the functions of the operate-calibrate switch. When the operate-calibrate switch is thrown to "calibrate" position, contacts SW2B are open and the path to relay 2B is open.

Another function of the operate-calibrate switch is to permit the apparatus to be sequenced through the two standardizing phases and to stop the sequencing cycle when it reaches the calibrate phase. With the operate-calibrate switch on a "calibrate" position, the apparatus can be run through its standardizing cycle by closing push button PB and the cycling will occur as has been described above. The operation continues as has been described until relays 4A and 4B have been operated. The energization of relay 4B operates contacts 4B2 (L24) which opens them and interrupts the circuit to the reference winding 116 to servo motor 53. (Under normal conditions, the path to winding 116 is maintained through switch contact SW2A (L23) but, the shifting of the switch SW "calibrate" opens that contact.) Since the servo motor can no longer drive, the reference potential across winding 113 which indicates a condition out of calibration, will remain standing on the winding for the servo motor, having a deenergized reference winding 116 cannot drive the potentiometer 52 which would correct the uncalibrated condition. The sequencing cycle therefore must stop for relay 7R remains energized holding open the circuit to relay 6R and the circuit to relay 5R whose energization is required to continue the cycle.

At this stage, relay 4B will have effected the closing of contacts 4B1 which will cause the operation of signal light S2 through the path including the now closed contacts SW2C2. The operation of the signal light S2 advises the operator that the apparatus has moved through the first two phases of standardization and has been stopped at the third phase. The operator can then adjust lock calibration potentiometer 123 or potentiometer 52 to bring the meter reading to 100% of full scale. This adjustment can be observed visually by making the adjustment while watching the meter. After the meter has been brought to 100% of full scale by the manipulation of either or both of the potentiometers 123 and 52, it is still possible for a potential to appear on the reference winding 113. The potential would be a result of the bucking voltage from potentiometer 137 being unequal to the voltage from the potentiometer 86. This condition will be indicated by the illumination of signal light S3. The path to signal light S3 is formed in part by contacts SW2D2 which was closed when the operate-calibrate switch SW was switched to "calibrate" position. Similarly, the contacts SW2D1 were opened. Since relay 7R remains energized because of the potential appearing across the winding 113, the contacts 7R2 will remain closed thereby providing a path to signal light S3 through contacts 3A3, 2B1 and 4B1.

The operator can adjust the position of the potentiometer 137 until the signal light S3 is extinguished, at which time he will know that he has brought the bucking voltage of that circuit into equality with the output of potentiometer 86.

The open condition of contacts SW2C1 prevents energization of relay 5R and consequently prevents a conclusion of the standardization cycle until the switch SW is returned to "operate" condition.

Circuit for recording profile

From time to time it may be desirable to drive the gauge transversely with respect to the web being measured to make a recording of a profile of the absorption characteristics of the material from one edge to the other. This operation is performed by the programmer and need not be described in detail here. However, the operation requires speed control contacts SC and gauge moving contacts GM (L9). The speed control contacts SC are closed at high speed and open at low speed. The gauge moving contacts GM are closed whenever the gauge is moving transversely.

In taking a profile, the gauge will move slowly from one edge of the sheet to the other and the chart 3 will be marked to show the beginning and end of the transverse profiling. At the conclusion of the profiling the gauge will be moved rapidly to its original position. During that rapid movement it is desirable to ground the cell. Accordingly, during that movement the SC and GM contacts will be closed, thereby energizing the relay 2B. The energization of relay 2B, as described above, closes the contacts 2B4 which energize the separate relay closing contacts 130 which grounds the cell.

Summary of operation

Refer to FIGURE 9, the standardization sequence may be initiated by either of two means:

(1) Timer TM on line L1 timing out and closing its contacts TM1 on line L3.

(2) Manual operation of pushbutton PB on line L4.

Once either of these events occur, the following sequence occurs: (In the discussion below, "up" means a relay is energized, and "dwn" means the relay is de-energized.)

| Step | Action | Line # | Comments |
| --- | --- | --- | --- |
| 1 | 1A up | L3 | Either TM contacts or PB contacts will close ckt. |
| 2 | 1A locks | L5 | Relay is subject to 5R1 contacts only. |
| 3 | OS up | L5 | 1A1 contacts complete the operate path. |
| 4A | 1B up | L6 | GP1 and 1A1 contacts close circuit. |
| 4B | Pen Motor 112 dwn | L26 | OS4 contacts disconnect motor from amplifier output. |
| 4C | Control Winding Servo Motor up | L24 | Combination of OS3 and 1B5 contacts connect output of recorder amplifier 91 to winding. |
| 5A | TC dwn | L2 | 1B6 contacts open circuit. |
| 5B | 2A up | L10 | 1B1 contacts close circuit. |
| 6A | Brakes 73 full on | L22 | Tc1 contacts short resistor which was in brake power supply to lower brake holding current. |
| 6B | Reference winding 116 Servo Motor up | L23 | TC2 contacts close circuit. |
| 6C | Brake 1 dwn | L16 | 2A3 contacts open circuit. |
| 6D | Clutch I up | L16 | 2A2 contacts close circuit. |
| 6E | 2B up | L8 | 2A1 contacts close circuit. |
| 7 | Zero Check on. Fig. 8 contacts 130 | | 2B contacts energize Zero Check relay grounding grid of electrometer tube. |
| 8 | 7R up | L25 | If the measuring amplifier including electrometer tube 84 is out of electrical balance, the input to the recorder amplifier will be something other than zero, resulting in an output voltage from the recorder amplifier 91. This will operate relay 7 as well as providing power to the control winding of the servo motor. This will cause the servo motor to drive the Zero Check Potentiometer 50 until the measuring amplifier is electrically balanced and the recorder input is zero; and thus the output zero. The motor will stop driving and relay 7R will then release. |
| 9 | 6R up | L18 | Relay 6R is a time delay relay that will operate 2 seconds after relay 7R is released. |

| Step | Action | Line # | Comments |
|---|---|---|---|
| 10 | 3A up and locks | L11, L12 | With relay 2A operated closing contacts 2A4, operation of 6R contacts 6R1 will close circuit. |
| 11A | 2A dwn | L10 | 3A1 contacts open circuit. |
| 11B | 6R dwn | L18 | 3A3 contacts open circuit. |
| 12A | 2B dwn | L8 | 2A1 contacts open circuit. |
| 12B | #1 Brake on Clutch off to potentiometer 50 | L16 and L22 | 2A2 and 2A3 contacts transfer circuit. |
| 12C | Hi-meg 120 to Standardizing connection 132 | Fig. 8 | Relays 3A5 and 3A6 contacts switch Hi-meg resistor 120 connection to Standardize point 132. |
| 13 | Zero Check off | Fig. 8, 130 | 2B4 contacts open circuit for Zero Check relay. |
| 14 | 3B up | L12 | 3B has same operate and lock path as 3A, but is a time delay relay, that delays the transfer of the Standardize Brake and Clutch until 2 seconds after the Hi-meg is connected to the Standardize point. This prevents needless driving of the Standardize pot 51, which could result from transients in the measuring section in switching from the Zero Check condition to the Standardize Condition, if this delay were not provided. |
| 15 | #2 Clutch on Brake off to potentiometer 51 | L24 | 3B2 and 3B3 transfer power source. |
| 16 | 7R up | L25 | If the positive current provided thru the Hi-meg resistor when connected to the Standardize point is not exactly equal to the negative current from the cell, resulting from the amount of radiation striking the cell when there is no material in the gap, then the input to the recorder amplifier 91 will be something other than zero resulting in an output voltage from the amplifier. This again will cause the servo motor to drive, but this time Pot #5 on line 19 will turn, and cause the voltage at the Standardize Point 132 to be adjusted to provide the exact amount of current to equal the current emanating from the cell. The input to the recorder amplifier will then be zero, with a resultant output of zero, which will cause relay 7R to release. |
| 17 | 6R up | L18 and L19 | Two seconds after relay 7R has been released, 6R will operate thru contacts 7R1, 3A4, 2B2, and 1B4. |
| 18 | 4A up | L13 | 6R2 contacts complete operate path. |
| 19A | 3A and 3B dwn | L12 | 4A2 contacts open lock circuit. |
| 19B | Bucking circuit introduced | Fig. 8, 137 | 4A6 and 4A7 contacts insert the Cal Balance voltage of potentiometer 137 in the input circuit of the recorder. This voltage is equal in magnitude to the voltage developed across output 90 when there is full scale reading of 100% on the meter scale, but of opposite polarity to that voltage, so that the resultant input to the recorder 91 is zero when the meter reads 100%. |
| 20A | #2 Clutch 68 off Brake 73 on potentiometer 52 | L19 and L24 | 3B-2 and 3B-3 transfer power source. |
| 20B | Hi-meg to Cal. Connection 123 | Fig. 8 | Combination of 3A released and 4A operated completes this connection. |
| 21 | 4B up | L14 | Relay 4B has the same operate and lock path as relay 4A, but has a two second time delay in operating. This permits the gauge to stabilize to the new circuit condition before potentiometer 52 will be driven. |
| 22 | #3 Clutch 68 on Brake 73 off | L13 and L24 | 4B-3 and 4B-4 contacts transfer power. |
| 23 | Potentiometer 52 7R up | L25 | If the positive current provided through the Hi-meg resistor 120 does not cause a resultant reading of exactly 100% on the meter, the input to the recorder amplifier 91 will be something other than zero resulting in an output voltage to operate relay 7R. The output voltage will also cause the servo-motor to drive potentiometer 52 which will insert or remove resistance until the meter reads exactly 100%. The recorder input will then be zero; the servo motor will stop; and relay 7R will release. |
| 24 | 6R up | L18 and L15 | The operate path for 6R at this time is through contacts 7R-1, 3A-3, 2B-1, and 4B-1. |
| 25 | 5R up | L15 | 6R-2 contacts complete operate path. |
| 26A | 1A dwn | L3 | 5R-1 contacts open circuit. |
| 26B | 4A and 4B dwn | L14 | 5R-5 contacts open circuit. |
| 27A | OS and 5R dwn | L5 and L15 | 1A-1 and 4B-1 contacts open circuits. |
| 27B | #3 Clutch 68 off Brake 7 on potentiometer 52 | L13 and L24 | 4B-3 and 4B-4 contacts transfer power. |
| 27C | Recorder 91 input normal | Fig. 8, 137 | 4A-6 and 4A-7 contacts restore circuit to normal condition, by removing bucking circuit. |
| 28D | Hi-meg 120 to Suppl. Connection 127 | Fig. 8, 120 and 127 | Release of relay 4A establishes normal connection of Hi-meg 120 to Lock Suppression potentiometer 122. |
| 28E | 1B dwn | L6 | 1A-3 contacts open circuit. |
| 28F | Rec. Pen motor connected | L27 | 1A-2 and OS-4 contacts transfer recorder output from servo motor 53 control winding to recorder pen motor 112. |
| 29A | TC up | L2 | 1B6 contacts close circuit for timer clutch which resets timer and allows timer motor TM on L1 to resume operation. |
| 29B | 6R dwn | L18 | 4B1 contacts open circuit. |
| 30A | Reference winding 110 open | L23 | TC contacts open circuit. |
| 30B | Brake power reduced | L22 | TC-1 contacts cause resistor to be inserted with power source. |
| 31 | Gauge restored | | Releasing the OS relay will permit the gauge operation to be returned to the control of the Program Panel. |

Having described my invention, I claim:

1. Apparatus for standardizing a gauge having a meter, a radiation source, a cell spaced from said source, and circuit means connected to said meter for determining the absorption characteristic comprising, means for connecting said cell to ground, means for correcting an unbalance in said circuit when said cell is connected to ground, means for standardizing said gauge on air in said airgap after said unbalance has been corrected, means for calibrating said circuit after it has been standardized on air, a single servomotor selectively connectable to each of said correcting, standardizing and calibrating means, said servomotor having a control winding, means for selectively and sequentially applying a potential to said control winding from each of said correcting, standardizing and calibrating means, means connected to said control winding for detecting a predetermined voltage condition on said control winding, and means initiated by said detector for initiating the operation of said standardizing means and said calibrating means in sequence immediately upon attaining a proper adjustment in the preceding operation.

2. Apparatus for standardizing a gauge having a meter, a radiation source, a cell spaced from said source, and circuit means connected to said meter for determining the absorption characteristic of a material disposed between the source and cell, said apparatus comprising, means for connecting said cell to ground, means for correcting an unbalance in said circuit when said cell is connected to ground, means for standardizing said gauge on air in said air-gap after said unbalance has been corrected, means for calibrating said circuit after it has been standardized on air, a single servomotor selectively connectable to each of said correcting, standardizing and calibrating means, said servomotor having a control winding, means for selectively and sequentially applying a potential to said control winding from each of said correcting, standardizing and calibrating means, a relay connected across said control winding, and means initiated by the de-energization of said relay for initiating the operation of said standardizing means and said calibrating means immediately upon attaining a proper adjustment in the preceding operation.

3. Apparatus for standardizing a guage having a meter, a radiation source, a cell spaced from said source, and circuit means connected to said meter for determining the absorption characteristic of a material disposed between the source and cell, said apparatus comprising, means for connecting said cell to ground, means for correcting an unbalance in said circuit when said cell is connected to ground, means for standardizing said gauge on air in said air-gap after said unbalance has been corrected, means for calibrating said circuit after it has been standardized on air, a single servomotor selectively connectable to each of said correcting, standardizing and calibrating means, said servomotor having a control winding, means for selectively and sequentially applying a potential to said control winding from each of said correcting, standardizing and calibrating means, a relay connected across said control winding, and a capacitor in series with said relay, and means initiated by the de-energization of said relay for initiating the operation of said standardizing means and said calibrating means immediately upon attaining a proper adjustment in the preceding operation.

4. Apparatus for standardizing a gauge having a meter, a radiation source, a cell spaced from said source, and circuit means connected to said meter for determining the absorption characteristic comprising, means for connecting said cell to ground, means for correcting an unbalance in said circuit when said cell is connected to ground, means for standardizing said gauge on air in said air-gap after said unbalance has been corrected, means for calibrating said circuit after it has been standardized on air, a single servomotor selectively connectable to each of said correcting, standardizing and calibrating means, said servomotor having a control winding, means for selectively and sequentially applying a potential to said control winding from each of said correcting, standardizing and calibrating means, means connected to said control winding for detecting a predetermined voltage condition on said control winding, and means initiated by said detector for initiating the operation of said standardizing means and said calibrating means in sequence immediately upon attaining a proper adjustment in the preceding operation, said initiating means including a time delay relay energized by said detector and operable only following a preselected interval, thereby assuring a steady state condition of potential on said control winding before initiating the next succeeding operation.

5. Apparatus for standardizing a gauge having a meter, a radiation source, a cell spaced from said source and capable of developing a negative direct current upon receiving radiations from said source, and circuit means connected to said meter for determining the absorption characteristic of a material disposed between the source and cell, said apparatus comprising, a direct current amplifier between said cell and said meter, a reference voltage circuit for supplying a positive direct current at a summing point at the output of said cell, said reference voltage circuit including a source of direct current connected to said summing point through at least two series connected potentiometers.

said potentiometer adjacent said summing point supplying a low current to said summing point during normal operation, said potentiometer remote from said summing point selectively supplying a higher current to said summing point during standardization, a shunt resistor connected across said remote potentiometer, means for connecting said cell to ground, means for correcting an unbalance in said circuit when said cell is connected to ground, means for standardizing said gauge on air in said air-gap after said unbalance has been corrected, said standardizing means including means for selectively connecting a point between said potentiometers to said summing point and means for varying the magnitude of current through said potentiometers, means for calibrating said circuit after it has been standardized on air, said calibrating means including means for connecting said remote potentiometer to said summing point, and means for initiating the operation of said standardizing and calibrating means in the sequence immediately upon attaining adjustment in the preceding operation.

6. Apparatus for standardizing a gauge having a meter, a radiation source, a cell spaced from said source and capable of developing a negative direct current upon receiving radiations from said source, and circuit means connected to said meter for determining the absorption characteristic of a material disposed between the source and cell, said apparatus comprising, a direct current amplifier connecting said cell to said meter, a reference voltage circuit for supplying a positive direct current at a summing point at the output of said cell, said reference voltage circuit including a source of direct current connected to said summing point through at least two series connected potentiometers, said potentiometer adjacent said summing point supplying a low current to said summing point during normal operation, said potentiometer remote from said summing point selectively supplying a higher current to said summing point during standardization, means for connecting said cell to ground, means for correcting an unbalance in said circuit when said cell is connected to ground, means for standardizing said gauge on air in said air-gap after said unbalance has been corrected, said standardizing means including means for selectively connecting a point between said potentiometers to said summing point and means for varying the magnitude of current through said potentiometers, means for calibrating said circuit after it has been standardized on air, said calibrating means including means for connecting said remote potentiometer to said summing point and means for applying a bucking voltage to the output of said amplifier, and means for initiating the operation of said standardizing and calibrating means in the sequence immediately upon attaining adjustment in the preceding operation.

References Cited

UNITED STATES PATENTS 2,792,542  5/1957  Robinson ___________ 318—28
2,829,268  3/1958  Chope _____________ 250—83
2,955,206  10/1960 Spergel ____________ 250—83.3

RALPH G. NILSON, *Primary Examiner.*

JAMES W. LAWRENCE, *Examiner.*

S. ELBAUM, *Assistant Examiner.*